(12) United States Patent
Tamura

(10) Patent No.: US 8,875,245 B2
(45) Date of Patent: Oct. 28, 2014

(54) AUTHORITY DELEGATING SYSTEM, AUTHORITY DELEGATING METHOD, AUTHENTICATION APPARATUS, INFORMATION PROCESSING APPARATUS, CONTROL METHOD, AND COMPUTER-READABLE MEDIUM

(75) Inventor: Yu Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/227,808

(22) Filed: Sep. 8, 2011

(65) Prior Publication Data

US 2012/0102548 A1    Apr. 26, 2012

(30) Foreign Application Priority Data

Oct. 22, 2010    (JP) ................ 2010-237914

(51) Int. Cl.
- *H04L 9/32*  (2006.01)
- *G06F 21/20*  (2006.01)
- *H04L 9/00*  (2006.01)
- *H04L 29/06*  (2006.01)
- *G06F 21/31*  (2013.01)

(52) U.S. Cl.
CPC ............ *H04L 63/0884* (2013.01); *G06F 21/31* (2013.01)
USPC ...... 726/4; 726/7; 726/21; 713/168; 709/226; 705/52; 705/67

(58) Field of Classification Search
CPC ....... G06F 21/31; G06F 21/335; G06F 21/33; G06F 21/6218; H04L 63/0807; H04L 63/0823; H04L 63/10; H04L 63/101; H04L 63/102

USPC .......... 726/1–7, 21; 705/51, 52, 67; 709/226, 709/229; 713/168, 175, 185
See application file for complete search history.

(56) References Cited

U.S. PATENT DOCUMENTS 6,189,103 B1 *  2/2001  Nevarez et al. .................... 726/5
6,314,425 B1 * 11/2001  Serbinis et al. ....................... 1/1

(Continued)

FOREIGN PATENT DOCUMENTS

| JP | 2006-221506 | 8/2006 |
| JP | 2010-218291 | 9/2010 |
| WO | 2009/084601 | 7/2009 |

OTHER PUBLICATIONS

Jun Li et al, Access Control for the Services Oriented Architecture, ACM 2007.*

(Continued)

*Primary Examiner* — David Garcia Cervetti
*Assistant Examiner* — Shanto M Abedin
(74) *Attorney, Agent, or Firm* — Fitzpatrick, Cella, Harper & Scinto

(57) ABSTRACT

An authentication apparatus receives an authority delegating request from an apparatus, acquires information of authorities possessed by the user from a storage unit, presents information of the acquired authorities to the user, and receives an instruction indicating which of the authorities possessed by the user is delegated to the apparatus. A storage unit stores, when the instruction to delegate the authority to the apparatus is received, an identifier required to uniquely identify the instruction and the authority instructed by the user to delegate, in association with each other. Authentication information indicating delegation of the authority is transmitted to the apparatus based on the instruction from the user.

7 Claims, 16 Drawing Sheets

(56) References Cited

U.S. PATENT DOCUMENTS

| | | | |
|---|---|---|---|
| 7,827,595 B2* | 11/2010 | Gociman | 726/4 |
| 2003/0004885 A1* | 1/2003 | Banerjee et al. | 705/52 |
| 2004/0034774 A1* | 2/2004 | Le Saint | 713/169 |
| 2004/0073530 A1* | 4/2004 | Stringer-Calvert et al. | 707/1 |
| 2004/0073801 A1* | 4/2004 | Kalogridis et al. | 713/176 |
| 2005/0050354 A1* | 3/2005 | Gociman | 713/201 |
| 2005/0120211 A1* | 6/2005 | Yokoyama | 713/168 |
| 2007/0245414 A1* | 10/2007 | Chan et al. | 726/12 |
| 2007/0273913 A1* | 11/2007 | Nakata | 358/1.14 |
| 2008/0066159 A1* | 3/2008 | Dillaway et al. | 726/4 |
| 2008/0104675 A1* | 5/2008 | Kusano et al. | 726/4 |
| 2009/0100525 A1* | 4/2009 | Uchikawa | 726/26 |
| 2009/0193499 A1* | 7/2009 | Srivastava et al. | 726/2 |
| 2009/0254978 A1* | 10/2009 | Rouskov et al. | 726/4 |
| 2010/0281522 A1* | 11/2010 | Hatakeyama | 726/4 |
| 2011/0225643 A1* | 9/2011 | Faynberg et al. | 726/10 |

OTHER PUBLICATIONS

Jin-Bum Hwang et al, A Security Model for Home Networks with Authority Delegation, Springer-Verlag Berlin Heidelberg, 2006.*

David W Chadwick, Dynamic Delegation of Authority in web Services, pp. 112-138, IGI Global, 2008.*

Japanese Office Action dated Jun. 6, 2014 issued during prosecution of related Japanese application No. 2010-237914.

* cited by examiner

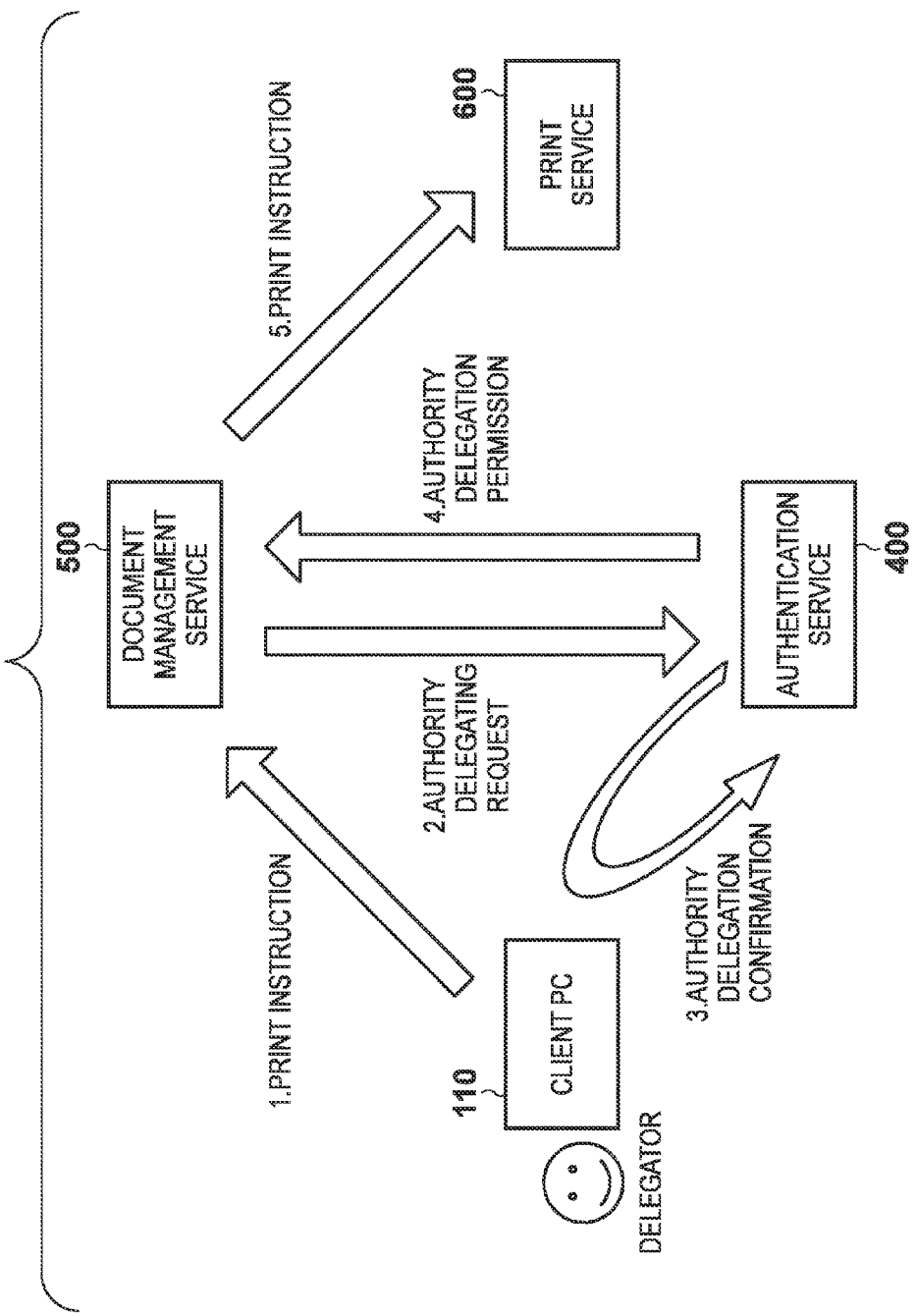

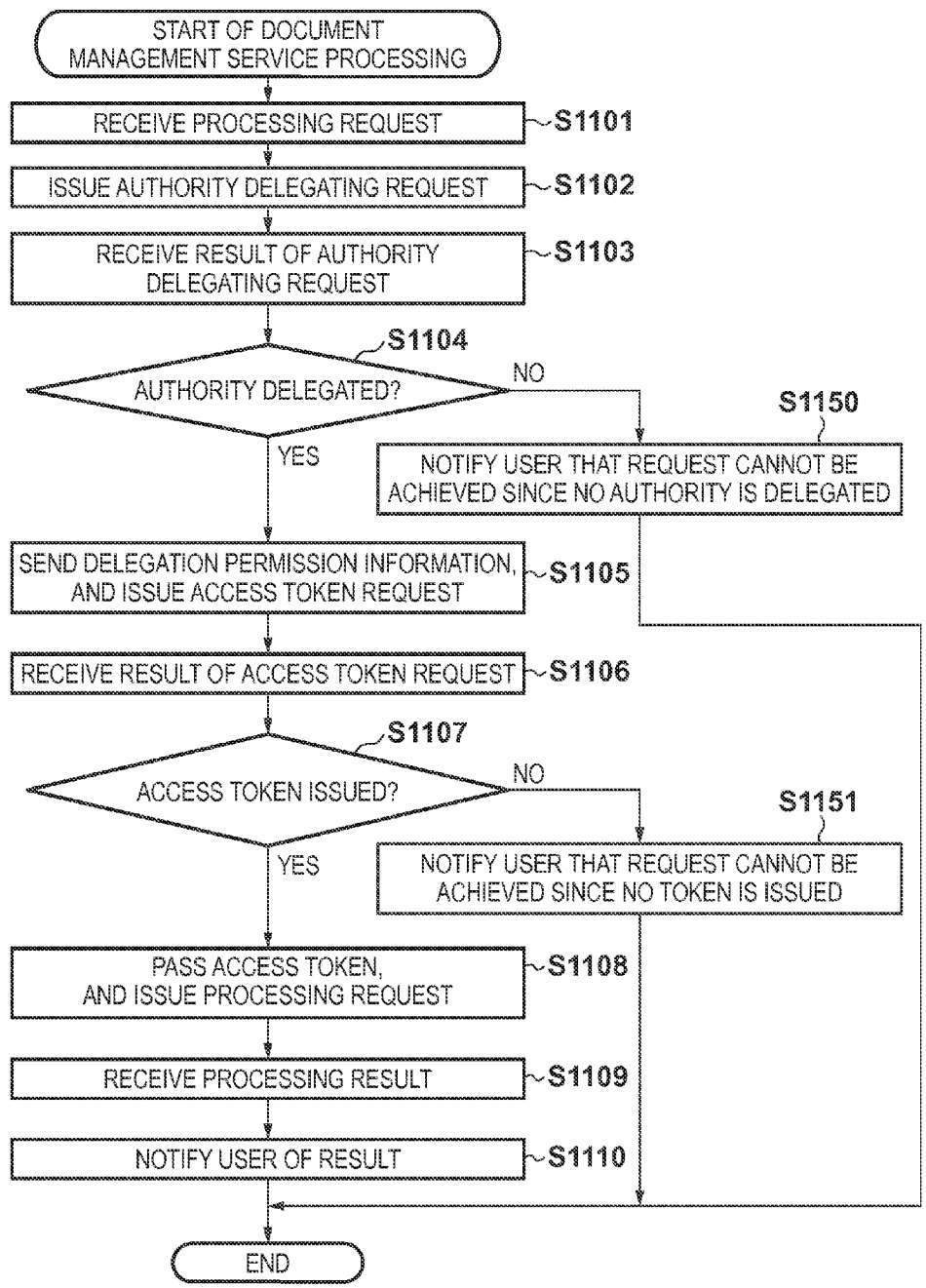

F I G. 10A
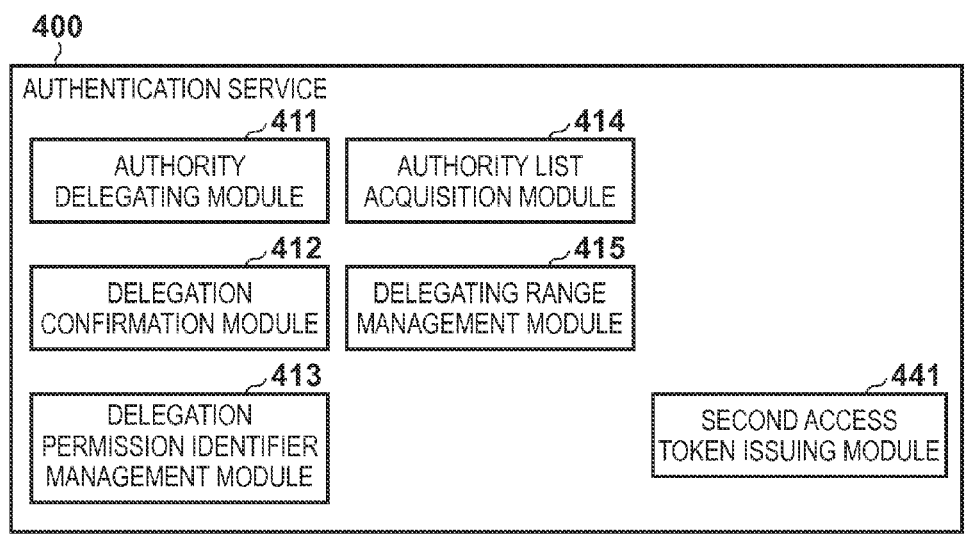
F I G. 10B
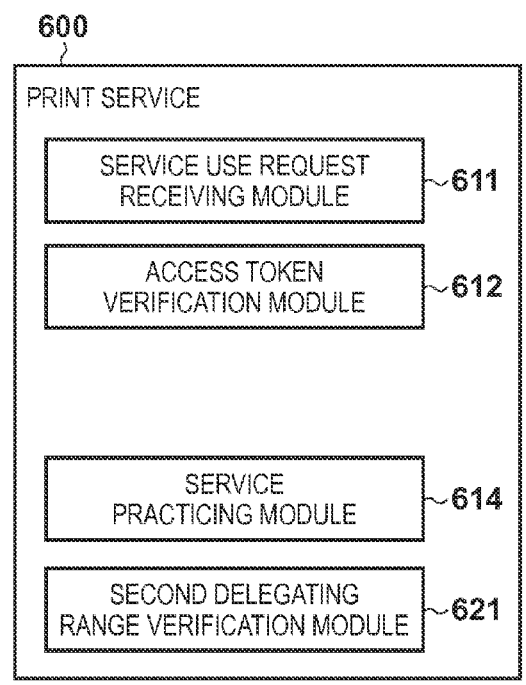

AUTHORITY DELEGATING SYSTEM, AUTHORITY DELEGATING METHOD, AUTHENTICATION APPARATUS, INFORMATION PROCESSING APPARATUS, CONTROL METHOD, AND COMPUTER-READABLE MEDIUM

BACKGROUND OF THE INVENTION

1. Field of the Invention

The present invention relates to an authority delegating system, which delegates a protected authority of a user to another agent without impairing the user's convenience, an authority delegating method, authentication apparatus, information processing apparatus, control method, and computer-readable medium.

2. Description of the Related Art

Conventionally, a method of delegating an access authority of processing for a protected resource, which is possessed by a certain user, to another agent has been proposed. For example, Japanese Patent Laid-Open No. 2006-221506 has proposed a method of delegating an access authority for a protected resource, which is possessed by a user as an authority delegator to another user as a delegatee. This method is implemented in such a manner that an authority delegator as a possessor of a protected resource acquires an access token as evidence of permission of an access to that resource, and delegates the acquired access token to a delegatee who wants to access to that resource.

To meet growing demands for cooperations between services developed on the Internet, a protocol for delegating an access authority of a user to another agent has been examined. For example, WRAP (OAuth Web Resource Authorization Profiles) examined in IETF (The Internet Engineering Task Force) is known.

SUMMARY OF THE INVENTION

According to one aspect of the present invention, there is provided an authority delegating system, which comprises an authentication apparatus, and delegates an authority possessed by a user to a second apparatus which requests a first apparatus, that executes processing according to the authority, to execute the processing, the authentication apparatus comprising: a receiving unit configured to receive an authority delegating request from the second apparatus; an acquisition unit configured to acquire information of authorities possessed by the user from a storage unit; a confirmation unit configured to present information of the authorities acquired by the acquisition unit to the user, and to receive an instruction indicating which of the authorities possessed by the user is delegated to the second apparatus; a storage unit configured to store, when the confirmation unit receives the instruction to delegate the authority to the second apparatus, an identifier required to uniquely identify the instruction and the authority instructed by the user to delegate, in association with each other; and a transmission unit configured to transmit authentication information indicating delegation of the authority to the second apparatus based on the instruction from the user, and the first apparatus comprising: a request receiving unit configured to receive a processing request from the second apparatus and the authentication information; a verification unit configured to verify using the authentication information which of authorities the second apparatus is delegated from the user; and an execution unit configured to execute processing based on the processing request when the authority required to execute the processing based on the processing request is delegated to the second apparatus as a result of verification by the verification unit.

According to another aspect of the present invention, there is provided an authentication apparatus, included in an authority delegating system which delegates an authority possessed by a user to a second apparatus which requests a first apparatus that executes processing according to the authority to execute the processing, the apparatus comprising: a receiving unit configured to receive an authority delegating request from the second apparatus; an acquisition unit configured to acquire information of authorities possessed by the user from a storage unit; a confirmation unit configured to present information of the authorities acquired by the acquisition unit to the user, and to receive an instruction indicating which of the authorities possessed by the user is delegated to the second apparatus; a storage unit configured to store, when the confirmation unit receives the instruction to delegate the authority to the second apparatus, an identifier required to uniquely identify the instruction and the authority instructed by the user to delegate, in association with each other; and a transmission unit configured to transmit authentication information indicating delegation of the authority to the second apparatus based on the instruction from the user.

According to another aspect of the present invention, there is provided an information processing apparatus serving as a first apparatus in an authority delegating system which comprises an authentication apparatus and in which a user delegates an authority to a second apparatus, which requests the first apparatus that executes processing according to the authority, to execute the processing, the apparatus comprising: a request receiving unit configured to receive a processing request from the second apparatus and authentication information issued by the authentication apparatus; a verification unit configured to verify using the authentication information which of authorities the second apparatus is delegated from the user; and an execution unit configured to execute processing based on the processing request when an authority required to execute the processing based on the processing request is delegated to the second apparatus as a result of verification by the verification unit.

According to another aspect of the present invention, there is provided an authority delegating method in an authority delegating system, which comprises an authentication apparatus, and delegates an authority possessed by a user to a second apparatus which requests a first apparatus, that executes processing according to the authority, to execute the processing, the method comprising: in the authentication apparatus, a receiving step of receiving an authority delegating request from the second apparatus; an acquisition step of acquiring information of authorities possessed by the user from a storage unit; a confirmation step of presenting information of the authorities acquired in the acquisition step to the user, and receiving an instruction indicating which of the authorities possessed by the user is delegated to the second apparatus; a storage step of storing, when the instruction to delegate the authority to the second apparatus is received in the conformation step, an identifier required to uniquely identify the instruction and the authority instructed by the user to delegate, in association with each other; and a transmission step of transmitting authentication information indicating delegation of the authority to the second apparatus based on the instruction from the user, and in the first apparatus, a request receiving step of receiving a processing request from the second apparatus and the authentication information; a verification step of verifying using the authentication information which of authorities the second apparatus is delegated from the user; and an execution step of executing processing based on the processing request when the authority required to execute the processing based on the processing request is delegated to the second apparatus as a result of verification in the verification step.

According to another aspect of the present invention, there is provided a control method of an authentication apparatus, included in an authority delegating system which delegates an authority possessed by a user to a second apparatus which requests a first apparatus that executes processing according to the authority to execute the processing, the method comprising: a receiving step of receiving an authority delegating request from the second apparatus; an acquisition step of acquiring information of authorities possessed by the user from a storage unit; a confirmation step of presenting information of the authorities acquired in the acquisition step to the user, and receiving an instruction indicating which of the authorities possessed by the user is delegated to the second apparatus; a storage step of storing, when the instruction to delegate the authority to the second apparatus is received in the confirmation step, an identifier required to uniquely identify the instruction and the authority instructed by the user to delegate, in association with each other; and a transmission step of transmitting authentication information indicating delegation of the authority to the second apparatus based on the instruction from the user.

According to another aspect of the present invention, there is provided a control method of a first apparatus in an authority delegating system which comprises an authentication apparatus, and delegates an authority possessed by a user to a second apparatus, which requests the first apparatus that executes processing according to the authority, to execute the processing, the method comprising: a request receiving step of receiving a processing request from the second apparatus and authentication information issued by the authentication apparatus; a verification step of verifying using the authentication information which of authorities the second apparatus is delegated from the user; and an execution step of executing processing based on the processing request when an authority required to execute the processing based on the processing request is delegated to the second apparatus as a result of verification in the verification step.

According to another aspect of the present invention, there is provided a computer-readable medium storing a program for controlling a computer to function as: a receiving unit configured to receive an authority delegating request from an information processing apparatus; an acquisition unit configured to acquire information of authorities possessed by a user from a storage unit; a confirmation unit configured to present information of the authorities acquired by the acquisition unit to the user, and to receive an instruction indicating which of the authorities possessed by the user is delegated to the information processing apparatus; a storage unit configured to store, when the confirmation unit receives the instruction to delegate the authority to the information processing apparatus, an identifier required to uniquely identify the instruction and the authority instructed by the user to delegate in association with each other; and a transmission unit configured to transmit authentication information indicating delegation of the authority to the information processing apparatus based on the instruction from the user.

According to another aspect of the present invention, there is provided a computer-readable medium storing a program for controlling a computer to function as: a request receiving unit configured to receive a processing request from an information processing apparatus and authentication information issued by an authentication apparatus; a verification unit configured to verify using the authentication information which of authorities the information processing apparatus is delegated from a user; and an execution unit configured to execute processing based on the processing request when an authority required to execute the processing based on the processing request is delegated to the information processing apparatus as a result of verification by the verification unit.

According to the present invention, even when an authority delegator does not know delegable authorities in advance, the authority delegator can designate a range of authorities to be delegated, and can delegate the authorities to an authority use service as a delegatee, without changing a client application.

Further features of the present invention will become apparent from the following description of exemplary embodiments (with reference to the attached drawings).

BRIEF DESCRIPTION OF THE DRAWINGS

FIG. 3 is a view showing relations among services according to an embodiment;

FIG. 5 is a flowchart of document management service processing according to the embodiment;

FIGS. 10A and 10B are diagrams showing the module configurations of respective services according to the second embodiment;

DESCRIPTION OF THE EMBODIMENTS

In a conventional method, an agent which issues an access token is a client. In services developed on the Internet like a cloud service which has received a lot of attention in recent years, the client can be normally used in only a general Web browser, and providing a new additional function to the client results in a convenience drop. For this reason, the conventional method is not suited to services developed on the Internet.

Furthermore, in the conventional method, when a user delegates an authority, he or she has to know authorities which can be delegated to a delegatee, and it is difficult to appropriately delegate authorities.

The present invention provides to allow an authority delegator to designate a range of authorities and to delegate the authorities to an authority use service as a delegatee without changing a client application or adding a function to it, even when the user as the authority delegator does not know delegable authorities.

<First Embodiment>

[System Configuration]

Figure 1:
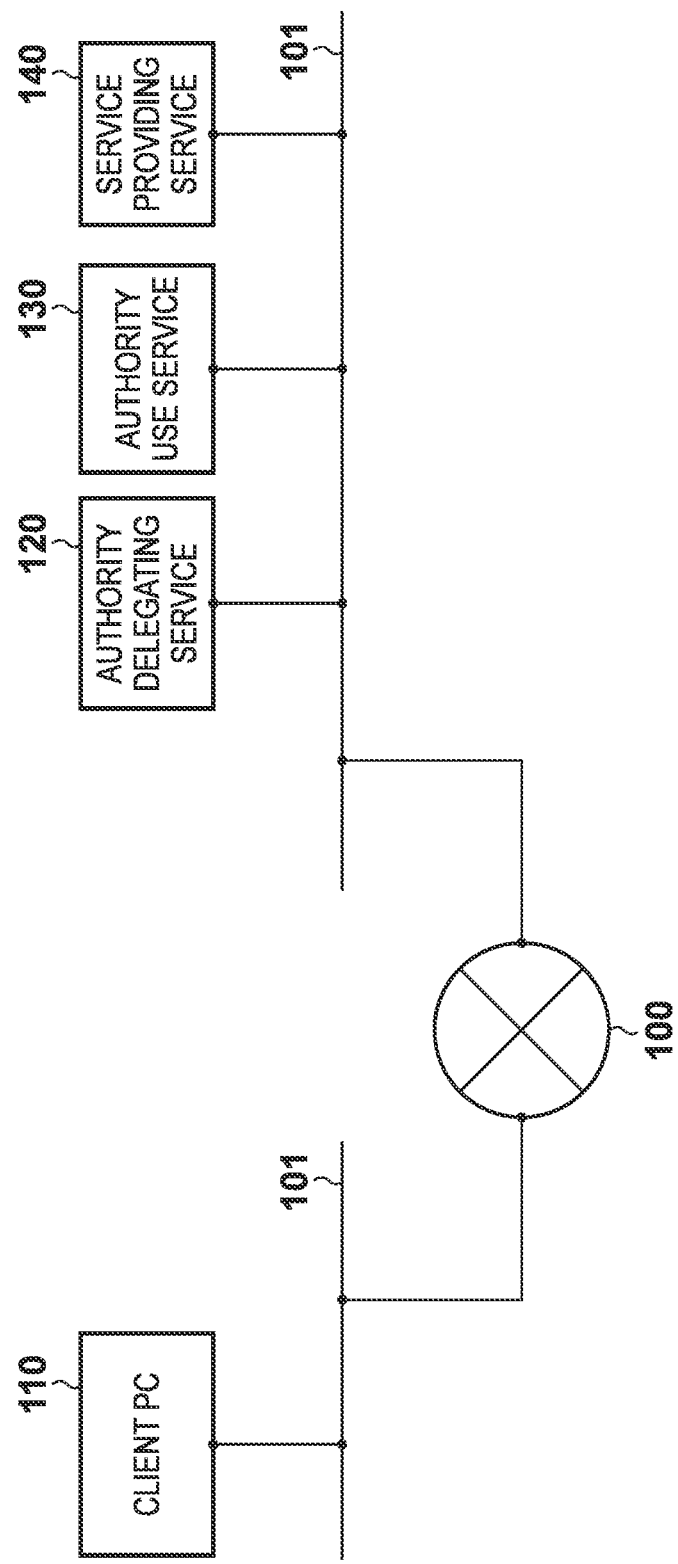
FIG. 1 is a diagram showing the network configuration.

Embodiments for carrying out the present invention will be described hereinafter with reference to the drawings. Note that in this specification, an authority delegator who delegates authorities possessed for predetermined files and information will be simply described as a delegator, and a side to whom authorities are delegated will be described as a delegatee. Note that the delegator implies a user who instructs to delegate authorities, but the delegatee implies an unit or apparatus for providing a service using the authorities in this embodiment. In this embodiment, "authority" implies an access authority for a resource unless otherwise specified. That is, "authority" is that about whether or not the user can execute processing for a resource. However, the present invention is not limited to this method. For example, "authority" is not that defined for each resource, but it may be handled as that about whether or not a service (function) itself provided by a service providing apparatus can be used. Also, processing may be made to handle both the authorities (those for a service and resource). An authority delegating system according to this embodiment is implemented on a network having the configuration shown in FIG. 1.

As a WAN (Wide Area Network) 100, a WWW (World Wide Web) system is established in the present invention. A LAN (Local Area Network) 101 connects respective components.

A client PC 110 is operated by a delegator, and issues instructions to services to be provided. An authority delegating service 120 asks the delegator for permission of authority delegation, and issues an access token (authentication information) as evidence of permission of delegation. An authority use service 130 receives the access token from the authority delegating service 120, and requests a service providing service 140 to execute processing. The service providing service 140 executes the processing in response to the request from the authority use service 130. The client PC 110, authority delegating service 120, authority use service 130, and service providing service 140 are connected via the WAN network 100 and LAN 101. Note that the authority delegating service 120, authority use service 130, and service providing service 140 may be configured on independent LANs or a single LAN. Also, these services may be configured on a single apparatus. Alternatively, one service may be implemented by a plurality of apparatuses. Note that in this specification, the service providing service 140 (or an apparatus which provides that service) will also be described as a first apparatus, and the authority use service 130 (or an apparatus which provides that service) will also be described as a second apparatus.

When a processing request for the authority use service 130 is generated on the client PC 110, the authority use service 130 requests the authority delegating service 120 to delegate an authority. The authority delegating service 120 which received the authority delegating request asks the client PC 110 for permission of authority delegation. When permission of authority delegation is granted, the authority delegating service 120 issues an access token to the authority use service 130. The authority use service 130 passes the received access token to the service providing service 140 to request it to execute processing.

Note that in this embodiment, when the delegator makes operations and instructions for respective services using the client PC 110, he or she uses a Web browser (not shown) included in the client PC 110.

Figure 2:
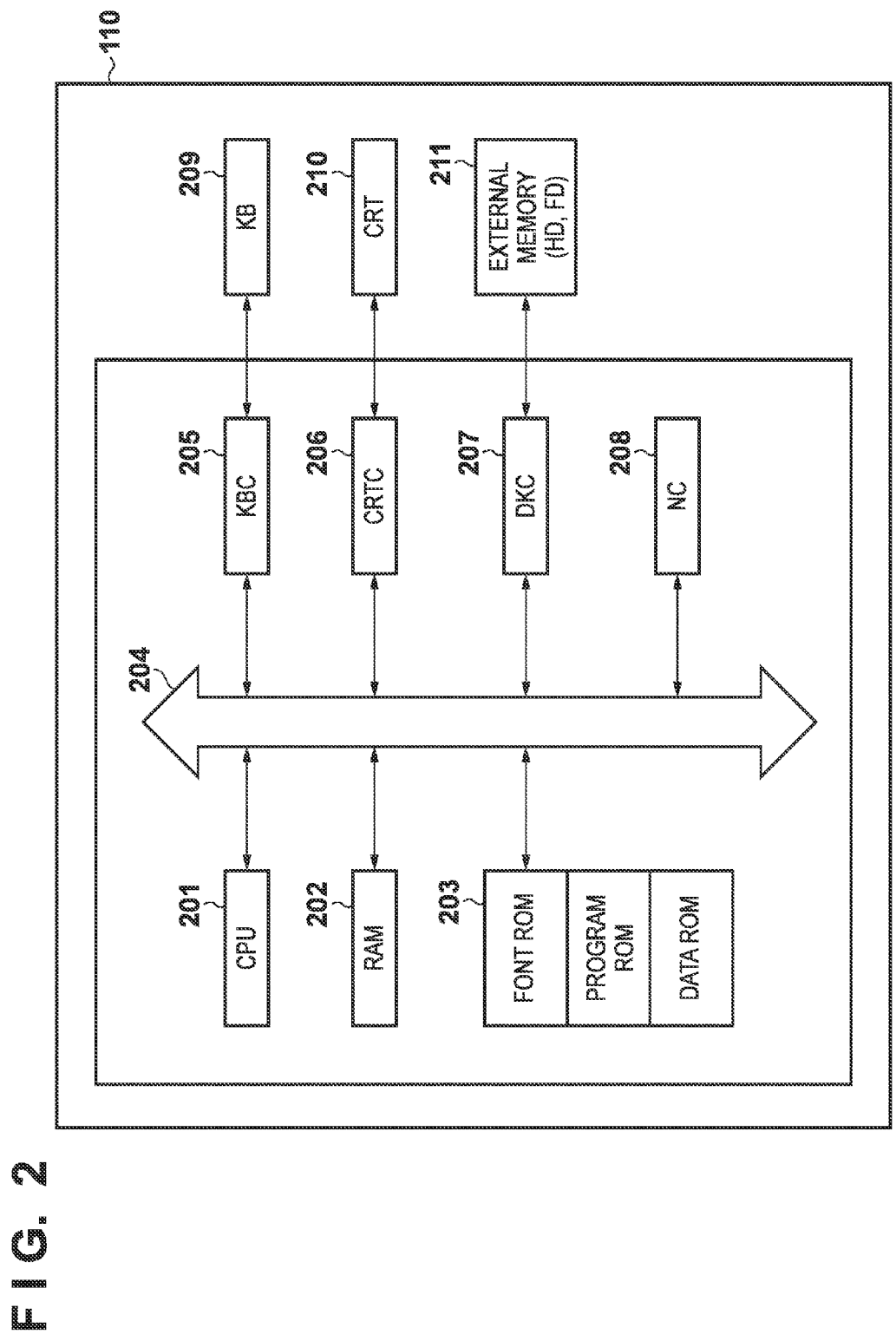
FIG. 2 is a block diagram showing the arrangement of a PC which uses or provides a service.

FIG. 2 is a block diagram showing the arrangement of a PC as an information processing apparatus which uses or provides services according to this embodiment. Note that the hardware block diagram shown in FIG. 2 corresponds to that of a general information processing apparatus, and the hardware arrangement of a general information processing apparatus can be applied to the client PC 110 of this embodiment. Also, the same arrangement can be applied to an information processing apparatus which provides each service.

Referring to FIG. 2, a CPU 201 executes programs such as an OS and applications which are stored in a program ROM of a ROM 203 or which are loaded from a hard disk 211 onto a RAM 202. In this case, the OS is short for an operating system which runs on a computer, and the operating system will be referred to as an OS hereinafter. Processes of respective flowcharts to be described later can be implemented by executing this program. The RAM 202 serves as a main memory, work area, and the like of the CPU 201. A keyboard controller (KBC) 205 controls key inputs from a keyboard 209 and a pointing device (not shown). A CRT controller (CRTC) 206 controls display of a CRT display 210. A disk controller (DKC) 207 controls data accesses to the hard disk (HD) 211, a Floppy® disk (FD), and the like, which store various data. An NC 208 is connected to a network, and executes communication control processing with other devices connected to the network.

Note that throughout the following description, a main body of execution of processing on hardware is the CPU 201, and that on software is an application program installed in the hard disk (HD) 211, unless otherwise specified.

[Cooperations Among Services]

In the following description, an authentication service 400 is assumed as the authority delegating service 120. Also, a document management service 500 is assumed as the authority use service 130, and a print service 600 is assumed as the service providing service 140. FIG. 3 shows relations among the services.

The delegator issues a print instruction of a document in the document management service 500 to the document management service 500 via the Web browser. In order to issue a print instruction of document data (to be simply referred to as a document hereinafter) designated by the delegator to the print service 600, the document management service 500 issues an authority delegating request of the delegator to the authentication service 400. When an authority is delegated, the document management service 500 issues a print instruction to the print service 600 while designating the document designated by the delegator. The print service 600 confirms the authority, delegation of which is permitted by the delegator, and prints the document designated by the document management service 500. Note that the authority delegating service 120 is not limited to the authentication service 400. Likewise, the authority use service 130 is not limited to the document management service 500, and the service providing service 140 is not limited to the print service 600.

[Module Configuration]

Figure 4A:
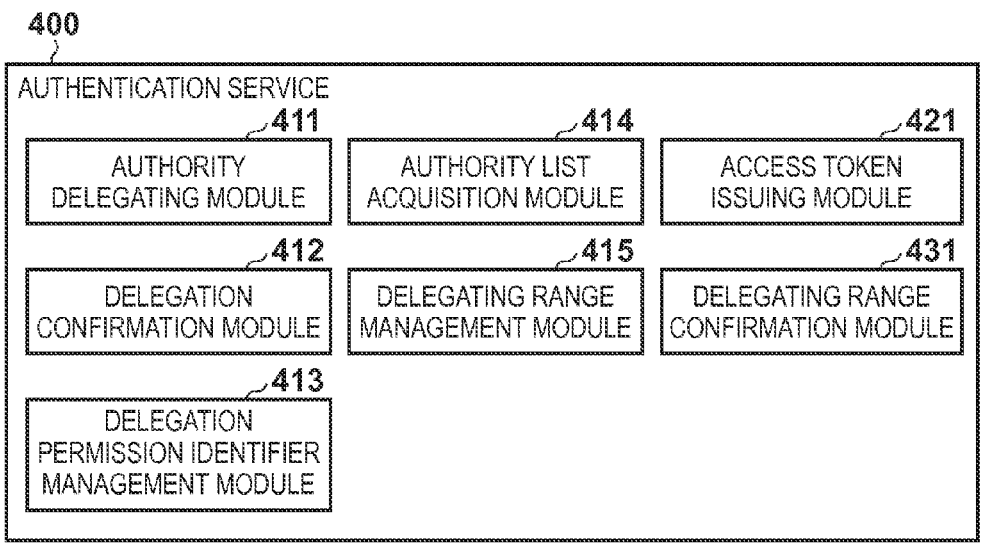
FIGS. 4A, 4B, and 4C are diagrams showing the module configurations of the respective services according to the embodiment.

FIG. 4A shows the module configuration of the authentication service 400 according to this embodiment. The authentication service 400 includes an authority delegating module 411, delegation confirmation module 412, and delegation permission identifier management module 413. Furthermore, the authentication service 400 includes an authority list acquisition module 414, delegating range management module 415, access token issuing module 421, and delegating range confirmation module 431.

When the delegator permits delegation of an authority in response to a request from the document management service 500, the authority delegating module 411 returns delegation permission information which advises accordingly to the document management service 500. Using this delegation permission information, the document management service 500 can acquire an access token required to access a resource. The delegation confirmation module 412 presents authorities acquired by the authority list acquisition module 414 to the delegator, and passes and saves the authorities, delegation of which is permitted, to the delegating range management module 415. The delegating range confirmation module 431 returns a range (types) of authorities, delegation of which is permitted by the delegator, in response to a request from the print service 600.

Figure 4B:
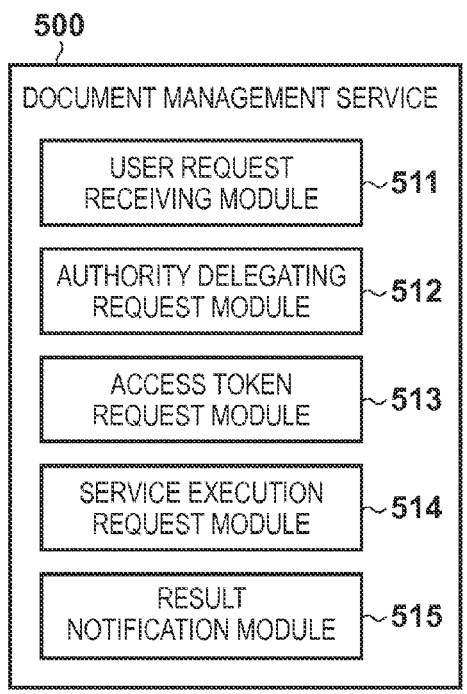

FIG. 4B shows the module configuration of the document management service 500 according to this embodiment. The document management service 500 includes a user request receiving module 511, authority delegating request module 512, access token request module 513, service execution request module 514, and result notification module 515.

The user request receiving module 511 receives a designated document print request from the client PC 110 based on an instruction of the delegator. In this embodiment, in order to process the designated document print request, the authority of the delegator for the print service 600 is required. Therefore, the authority delegating request module 512 requests the authentication module 400 to delegate an authority. When the authority is delegated, the access token request module 513 requests the authentication service 400 to issue an access token. The service execution request module 514 passes the acquired access token to the print service 600 to request it to execute print processing. Then, the result notification module 515 returns a print result to the client PC 110.

Figure 4C:
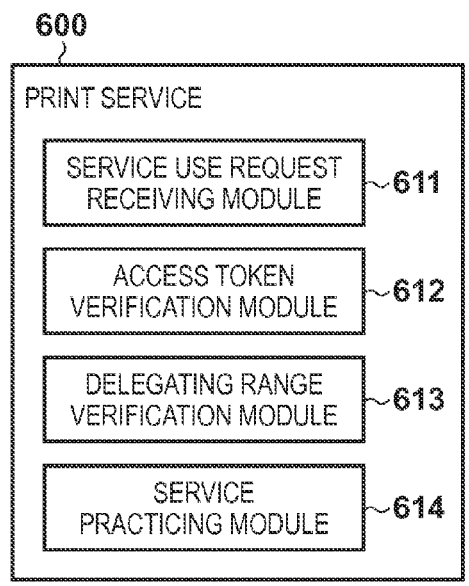

FIG. 4C shows the module configuration of the print service 600 according to this embodiment. The print service 600 includes a service use request receiving module 611, access token verification module 612, delegating range verification module 613, and service practicing module 614.

The service use request receiving module 611 receives a print processing request from the document management service 500. The access token verification module 612 confirms authenticity of an access token passed at the time of the processing request. The delegating range verification module 613 issues an inquiry to the authentication service 400 to determine whether or not an authority enough to execute the processing request from the document management service 500 is delegated. For example, when the document management service 500 issues a color print request, the delegating range verification module 613 determines whether or not a color print authority for a document is delegated. The service practicing module 614 practices the processing request received by the service use request receiving module 611 when an authority enough to execute the processing request is delegated from the delegator.

[Document Management Service Processing]

FIG. 5 is a flowchart of document management service processing by the document management service 500 according to this embodiment. Note that this processing is implemented when a CPU included in an apparatus, which implements the document management service 500 in this embodiment, executes a program stored in, for example, a ROM as a storage unit.

In step S1101, the user request receiving module 511 receives a print execution request, which designates a document in the document management service 500, from the client PC 110 operated by the delegator. The user request receiving module 511 confirms the contents of the request from the delegator. For example, when the request from the delegator includes print processing, the user request receiving module 511 determines that the print service 600 is required to be used.

Since it is determined in step S1101 that an authority for the print service 600 is required, the authority delegating request module 512 requests the authentication service 400 to delegate the authority in step S1102. In step S1103, the authority delegating request module 512 receives a result of the authority delegating request from the authority delegating module 411 of the authentication service 400.

In step S1104, the authority delegating request module 512 confirms the result of the authority delegating request received in step S1103. If the authority is delegated (YES in step S1104), the process advances to step S1105. If the authority is not delegated (NO in step S1104), the process advances to step S1150.

In step S1105, the access token request module 513 sends delegation permission information, which is received in step S1103, and indicates that delegation of the authority is permitted by the delegator, to the authentication service 400, and requests the authentication service 400 to issue an access taken required to access a resource. In step S1106, the access token request module 513 receives a result of the access token request in step S1105.

In step S1107, the access token request module 513 confirms the result of the access token request received in step S1106. At this time, if an access token is issued (YES in step S1107), the process advances to step S1108. If no access token is issued (NO in step S1107), the process advances to step S1151.

In step S1108, the service execution request module 514 passes the access token received in step S1106 to the print service 600, and requests the print service 600 to execute print processing of the document designated by the delegator in step S1101. At this time, the print request data may include the document itself or may include information indicating a storage location of the document. In step S1109, the service execution request module 514 receives a print processing result of the print service 600 in step S1108. In step S1110, the result notification module 515 notifies the client PC 110 operated by the delegator of the result received in step S1109, thus ending the sequence.

In step S1150, the authority delegating request module 512 notifies the client PC 110 that processing received from the client PC 110 cannot be attained since the authority is not delegated, thus ending the sequence.

In step S1151, the access token request module 513 notifies the client PC 110 operated by the delegator that processing received from the client PC 110 operated by the delegator cannot be attained since the token is not issued, thus ending the sequence.

[Authority Delegation Confirmation Processing]

Figure 6:
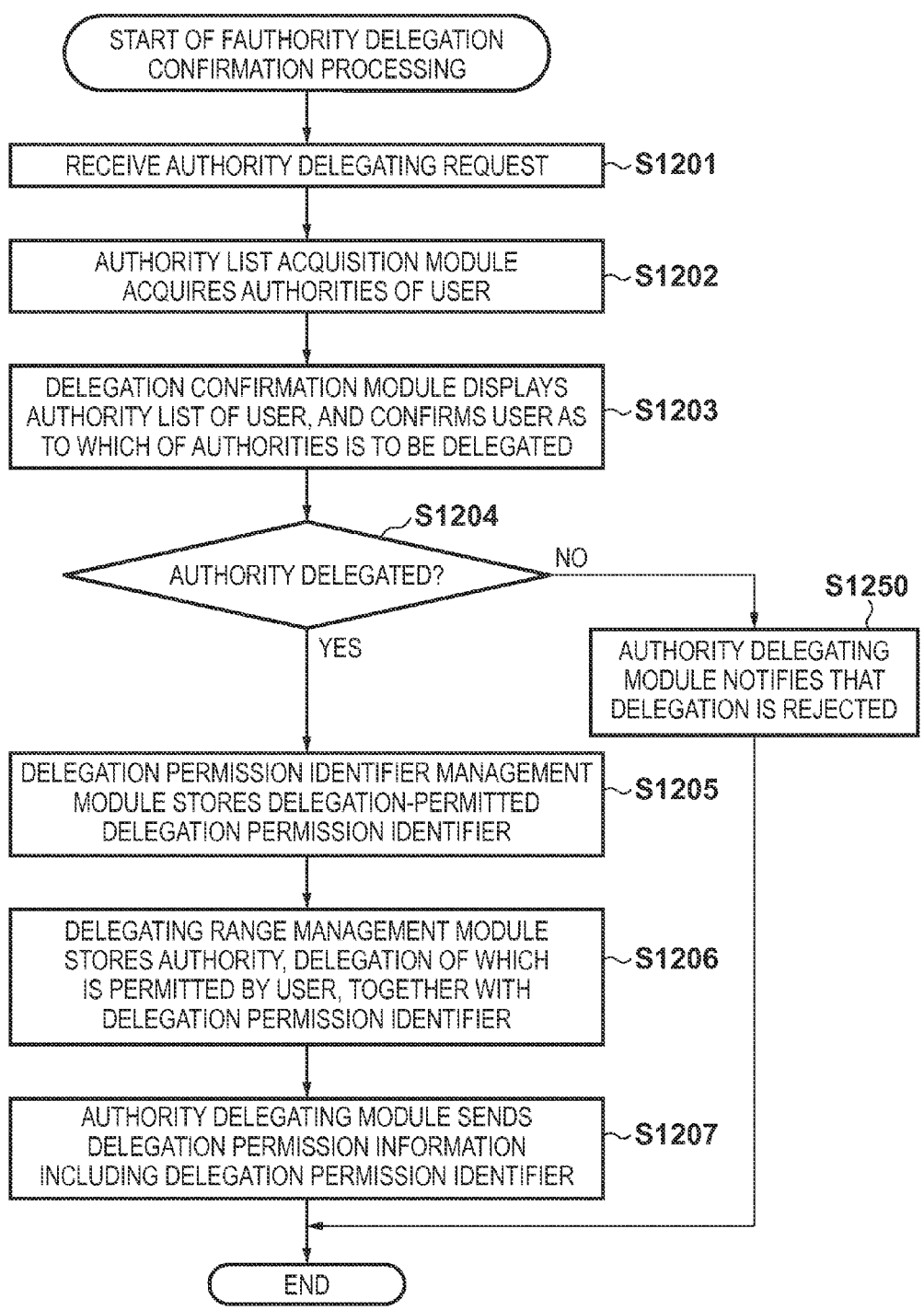
FIG. 6 is a flowchart of authority delegation confirmation processing according to the embodiment.

FIG. 6 is a flowchart of authority delegation confirmation processing by the authentication service 400 which received the authority delegating request according to this embodiment. Note that this processing is implemented when a CPU included in an apparatus, which implements the authentication service 400 in this embodiment, executes a program stored in, for example, a ROM as a storage unit.

In step S1201, the authority delegating module 411 receives an authority delegating request from the document management service 500. This step corresponds to step S1102 in FIG. 5. This process implements a receiving unit. In step S1202, the authority list acquisition module 414 acquires an authority list of the delegator for the print service 600. As for the authority list used in this step, for example, when the delegator has a color print authority and monochrome print authority for the print service 600, the acquired authority list includes the color print authority and monochrome print authority. In step S1203, the delegation confirmation module 412 presents the authority list of the delegator to the client PC 110 operated by the delegator, and inquires the delegator as to delegation of which of authorities is to be permitted. That is, a UI which presents the authority list to the delegator, and allows the delegator to instruct an authority to be delegated is provided. At this time, all the authorities possessed by the delegator may be delegated, or only some of the authorities may be delegated in terms of security. For example, in this case, the delegation confirmation module 412 inquires the delegator as to whether or not to permit delegation for each of the color print authority and monochrome print authority.

The delegation confirmation module 412 checks in step S1204 whether or not an authority is delegated in step S1203. If an authority is delegated (YES in step S1204), the process advances to step S1205. If no authority is delegated (NO in step S1204), the process advances to step S1250. For example, if delegation of at least one of the color print authority and monochrome print authority included in the presented authority list is permitted by the delegator, the process advances to step S1205. If delegation of none of the authorities is permitted, the process advances to step S1250.

In step S1205, the delegation permission identifier management module 413 stores a delegation-permitted delegation permission identifier. For example, if delegation of the color print authority is delegated in this case, a delegation permission identifier is stored as an identifier required to uniquely identify that delegation of the color print authority is permitted. Note that the delegation permission identifier may be generated by the document management service 500 prior to the delegation permission request, and may be sent while being included in the authority delegating request received by the authority delegating module 411 in step S1201. Alternatively, if the authority is delegated in step S1203, the authentication service 400 may generate the delegation permission identifier. The present invention is not limited to these generation methods. Also, a data structure of the delegation permission identifier may include, for example, the specific number of digits, which may be given sequentially or randomly.

In step S1206, the delegating range management module 415 stores the authority, delegation of which is permitted by the delegator in step S1203, in association with the delegation permission identifier stored in step S1205. For example, in this case, when the color print authority is delegated, that information is stored in association with the delegation permission identifier. In step S1207, the authority delegating module 411 sends the delegation permission information including the delegation permission identifier stored in step S1205 to the document management service 500, thus ending the sequence.

In step S1250, the authority delegating module 411 notifies the document management service 500 that authority delegation is rejected according to an instruction of the delegator, thus ending this sequence.

[Access Token Issuing Processing]

Figure 7:
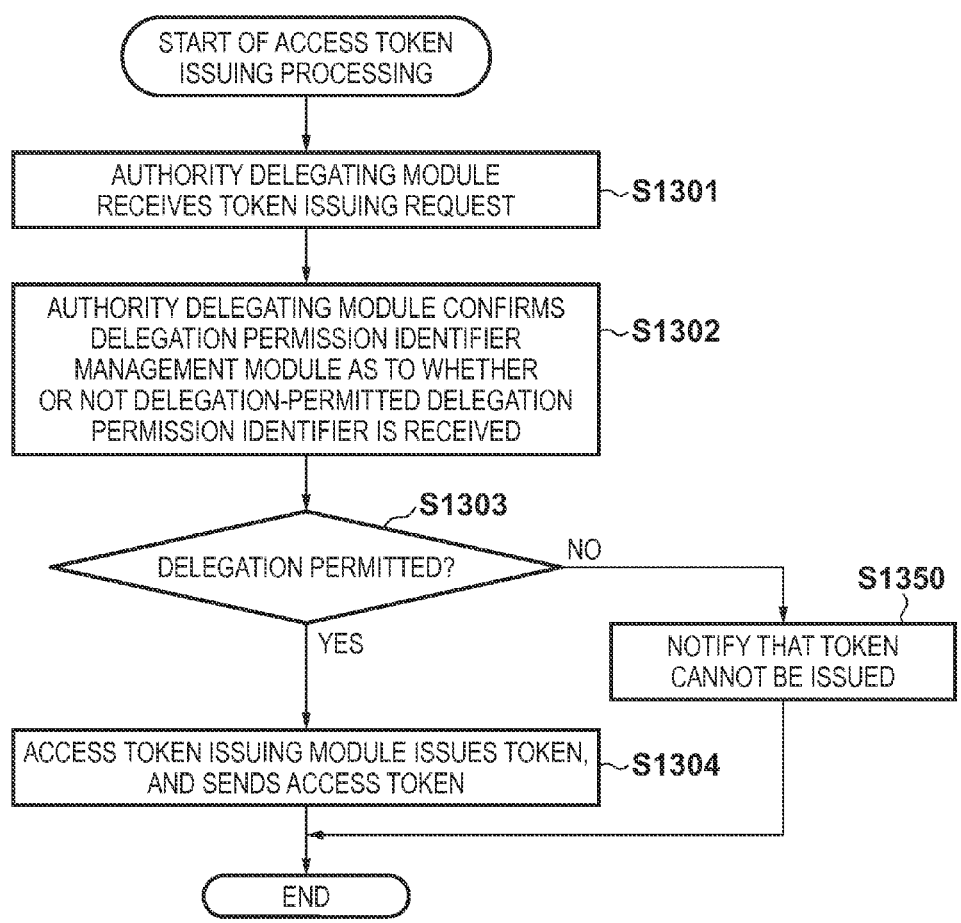
FIG. 7 is a flowchart of access token issuing processing according to the embodiment.

FIG. 7 is a flowchart of access token issuing processing by the authentication service 400 which received an access token issuing request. Note that this processing is implemented when a CPU included in an apparatus, which implements the authentication service 400 in this embodiment, executes a program stored in, for example, a ROM as a storage unit.

In step S1301, the authority delegating module 411 receives an access token issuing request from the document management service 500. This step corresponds to step S1103 in FIG. 6. In step S1302, the authority delegating module 411 confirms whether or not the delegation permission identifier included in the access token issuing request in step S1301 is stored in the delegation permission identifier management module 413.

The authority delegating module 411 checks in step S1303 whether or not the delegation permission identifier is stored in step S1302. If the delegation permission identifier is stored (YES in step S1303), the process advances to step S1304. If the delegation permission identifier is not stored (NO in step S1303), the process advances to step S1350.

In step S1304, the access token issuing module 421 issues an access token, and sends the access token to the document management service 500, thus ending the sequence. Assume that the access token includes the delegation permission identifier required to identify the delegated authority when it is issued. In step S1350, the access token issuing module 421 notifies the document management service 500 that an access token cannot be issued, thus ending the sequence.

[Authority List Return Processing]

Figure 8:
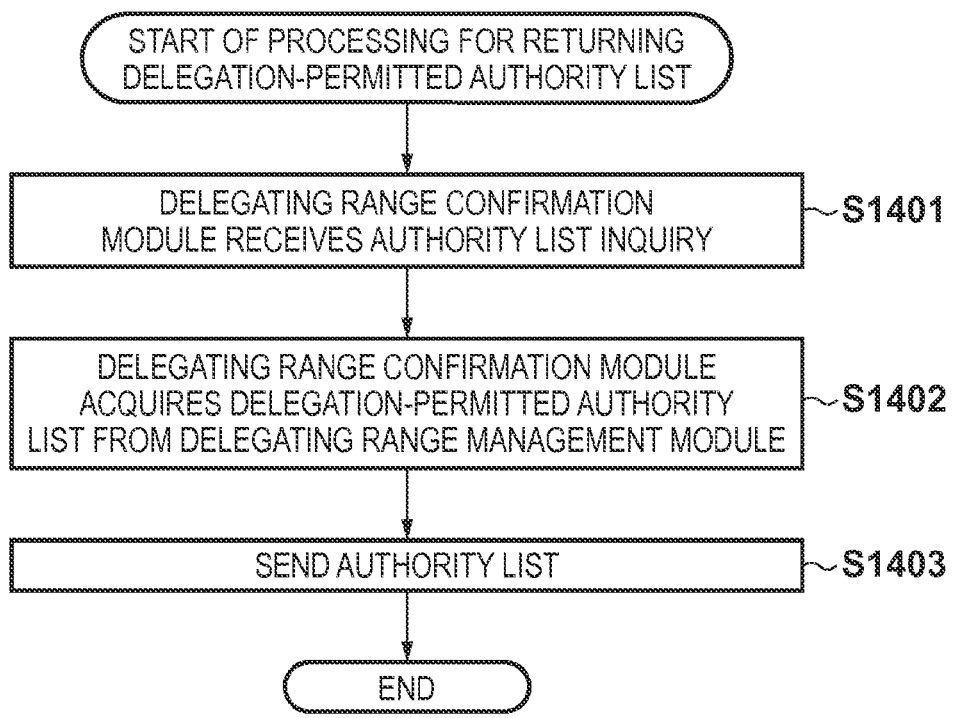
FIG. 8 is a flowchart of return processing of a delegation-permitted authority list according to the embodiment.

FIG. 8 is a flowchart of authority list return processing by the authentication service 400, which is requested to return the list of delegation-permitted authorities. Note that this processing is implemented when a CPU included in an apparatus, which implements the authentication service 400 in this embodiment, executes a program stored in, for example, a ROM as a storage unit.

In step S1401, the delegating range confirmation module 431 receives an inquiry of the authority list from the print service 600. In step S1402, the delegating range confirmation module 431 passes the delegation permission identifier included in the inquiry received in step S1401 to the delegating range management module 415 to acquire the delegation-permitted authority list. In step S1403, the delegating range confirmation module 431 sends the acquired authority list to the print service 600, thus ending the sequence.

[Print Service Processing]

Figure 9:
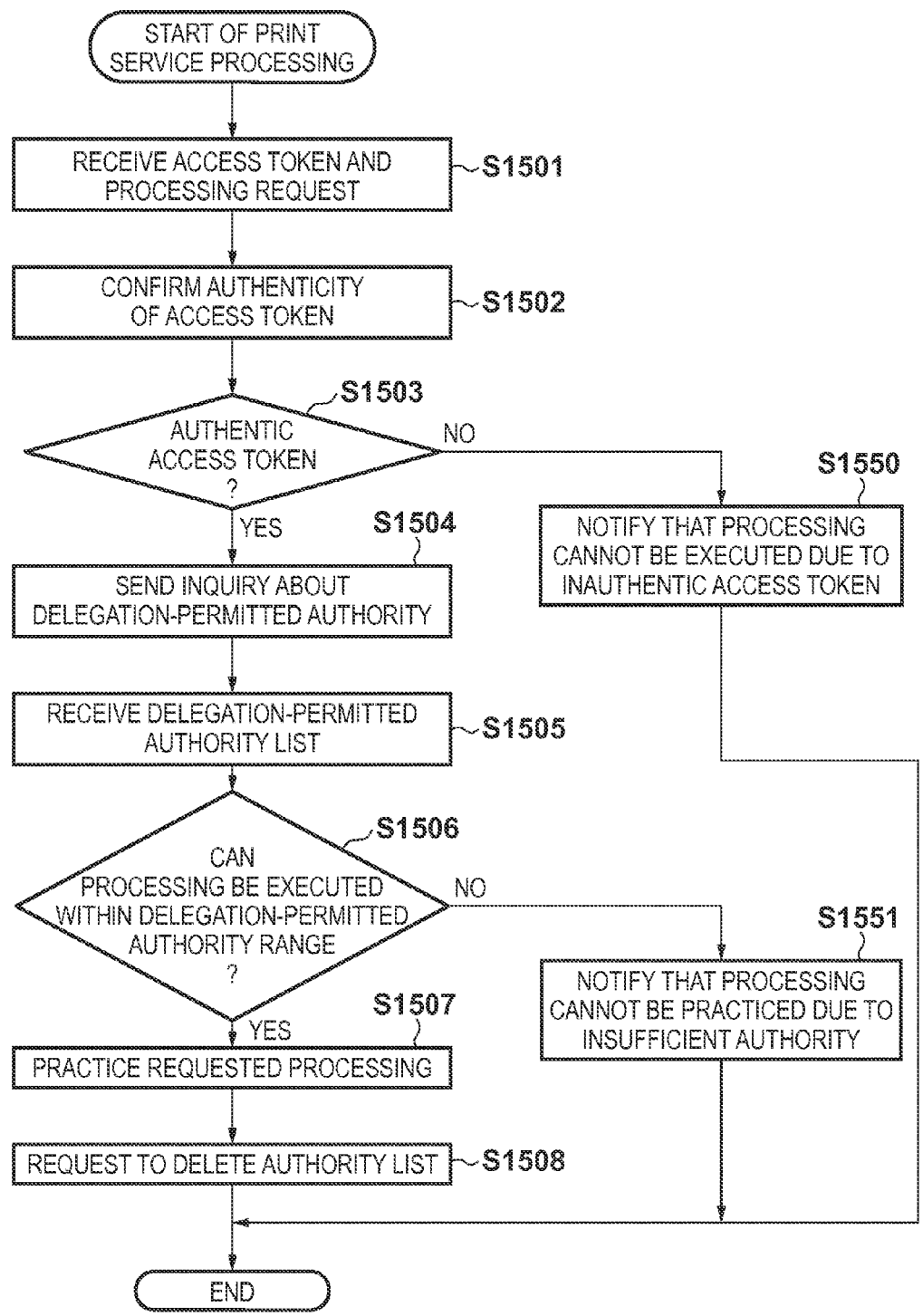
FIG. 9 is a flowchart of print service processing according to the embodiment.

FIG. 9 is a flowchart of print service processing by the print service 600 which received a processing request according to this embodiment. Note that this processing is implemented when a CPU included in an apparatus, which implements the print service 600 in this embodiment, executes a program stored in, for example, a ROM as a storage unit.

In step S1501, the service use request receiving module 611 receives a print request from the document management service 500 together with an access token. This process implements a request receiving unit. In step S1502, the access token verification module 612 confirms the authenticity of the access token received in step S1501. In this case, the access token may be passed to the authentication service 400 to confirm the authenticity of the access token. Alternatively, the authenticity of the access token may be confirmed by appending a digital signature to the access token via, for example, key exchange processing executed in advance between the print service 600 and authentication service 400. However, the present invention is not limited to these confirmation methods.

The access token verification module 612 checks in step S1503 whether or not the access token is authentic in step S1502. If the access token is authentic (YES in step S1503), the process advances to step S1504. If the access token is unauthentic (NO in step S1503), the process advances to step S1550.

In step S1504, the delegating range verification module 613 passes the delegation permission identifier included in the access token received in step S1501 to the authentication service 400 to request the authentication service 400 to return the delegation-permitted authority list. In this case, the authentication service 400 executes the processing shown in FIG. 8. In step S1505, the delegating range verification module 613 acquires the delegation-permitted authority list.

The delegating range verification module 613 checks in step S1506 whether or not the authority list received in step S1505 is enough to execute the processing request received in step S1501. As a result of checking, if the authority is enough to execute the processing request (YES in step S1506), the process advances to step S1507. If the authority is not enough to execute the processing (NO in step S1506), the process advances to step S1551.

In step S1507, the service practicing module 614 processes the processing request received in step S1501, and returns the result to the document management service 500. In step S1508, the delegating range verification module 613 requests the authentication service 400 to delete the authority list received in step S1505, thus ending the sequence.

In step S1550, the access token verification module 612 notifies the document management service 500 that the processing cannot be executed since the access token is inauthentic, thus ending the sequence. In step S1551, the delegating range verification module 613 notifies the document management service 500 that the processing cannot be executed due to an insufficient authority, thus ending the sequence.

Figure 12:
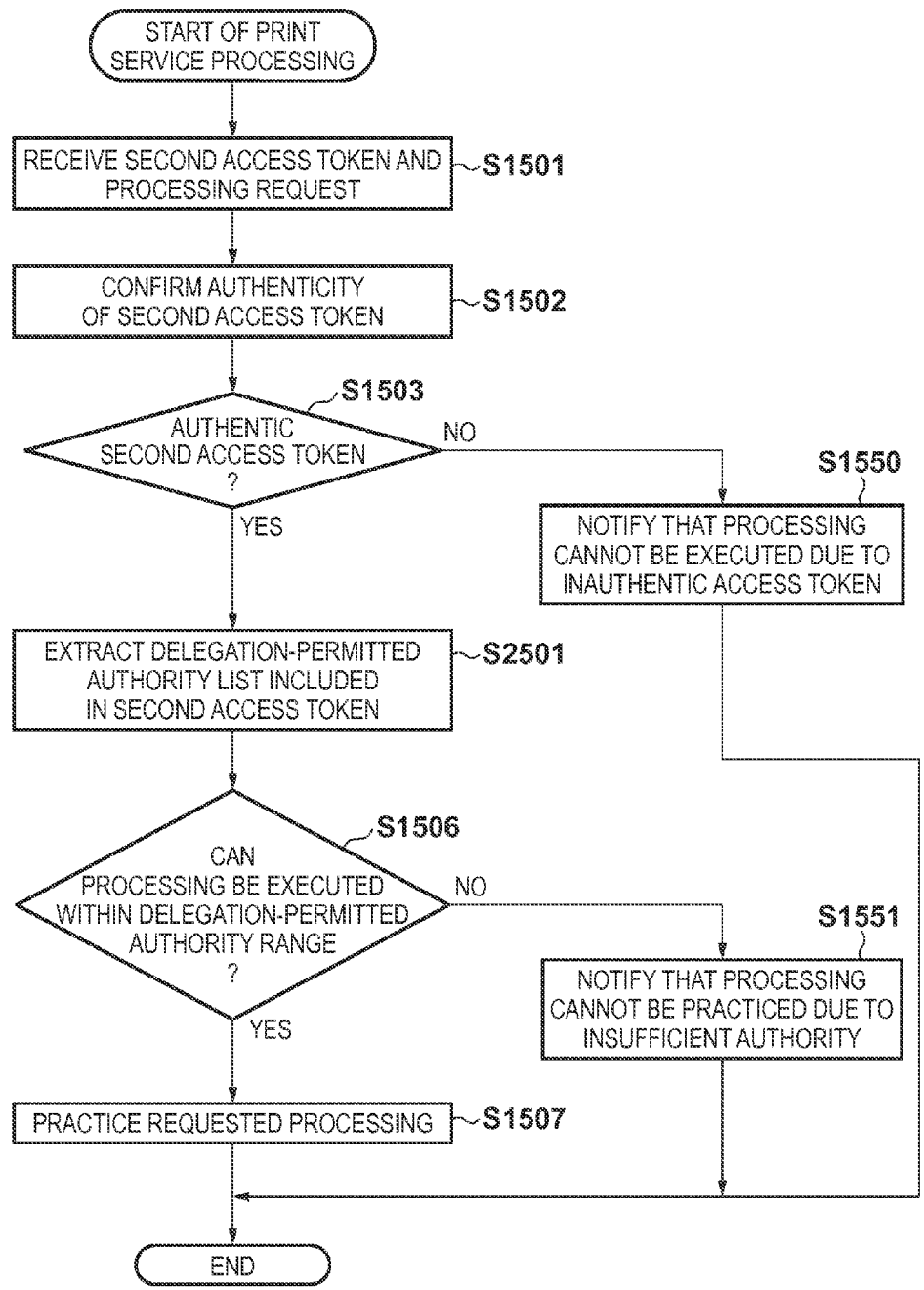
FIG. 12 is a flowchart of print service processing according to the second embodiment.

Note that the delegating range management module 415 of the authentication service 400 deletes the stored identifier and authority list after it receives the delete request of the authority list from the print service 600 (step S1508 in FIG. 12).

According to this embodiment, even when the delegator does not recognize delegable authorities, the delegator can designate a range of authorities, and can delegate the authorities to the authority use service as a delegatee, without changing the client application included in the client PC 110 or adding a function to it.

<Second Embodiment>

The second embodiment for carrying out the present invention will be described below with reference to the drawings. In the first embodiment, the authority delegating service 120 (authentication service 400) requires an additional storage area to cope with an inquiry from the service providing service 140 (print service 600) for the authority delegated by the delegator. By contrast, the second embodiment allows to delegate authorities by designating a range of authorities to be delegated without requiring this storage area.

[Module Configuration]

FIGS. 10A and 10B show the module configurations according to this embodiment. Differences from the module configurations in the first embodiment shown in FIGS. 4A to 4C will be described first.

FIG. 10A shows the module configuration of the authentication service 400 according to this embodiment. The authentication service 400 includes a second access token issuing module 441. By contrast, the authentication service 400 of this embodiment does not include the access token issuing module 421 and delegating range confirmation module 431 shown in FIG. 4A of the first embodiment. FIG. 10B shows the module configuration of the print service 600 according to this embodiment. The print service 600 includes a second delegating range verification module 621. By contrast, the print service 600 of this embodiment does not include the delegating range verification module 613 shown in FIG. 4C of the first embodiment.

[Access Token Issuing Processing]

Figure 11:
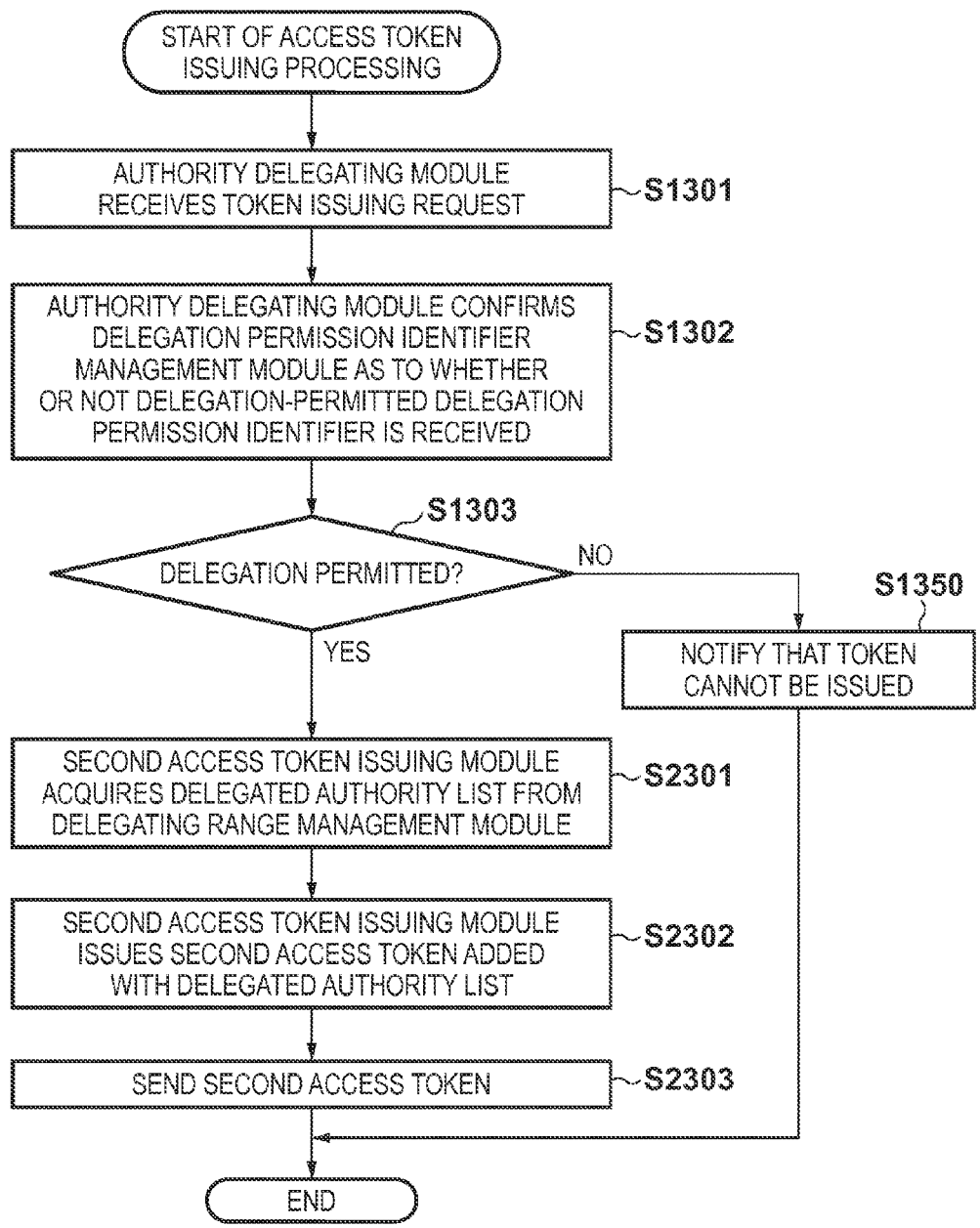
FIG. 11 is a flowchart of access token issuing processing according to the second embodiment.

FIG. 11 is a flowchart of the authentication service 400 which received an access token issuing request according to this embodiment. Note that this processing is implemented when a CPU included in an apparatus, which implements the authentication service 400 in this embodiment, executes a program stored in, for example, a ROM as a storage unit. Note that the same step numbers denote the same processes as in the flowchart of FIG. 7, and only differences will be described below. Note that "access token" in this embodiment indicates a second access token issued by the second access token issuing module 441 unless otherwise specified.

The authority delegating module 411 checks in step S1303 whether or not a delegation permission identifier which indicates permission of delegation of authorities is stored in step S1302. If the delegation permission identifier is stored (YES in step S1303), the process advances to step S2301. If the delegation permission identifier is not stored (NO in step S1303), the process advances to step S1350. In this case, when the delegation permission identifier is stored, this indicates that a delegator permits delegation of at least some authorities.

In step S2301, the second access token issuing module 441 acquires a delegation-permitted authority list from the delegating range management module 415 using the delegation permission identifier received in step S1301. In step S2302, the second access token issuing module 441 issues a second access token including the authority list acquired in step S2301. Then, the delegating range management module 415 deletes information of the authority list corresponding to the issued second access token. In step S2303, the second access token issuing module 441 sends the second access token issued in step S2302 to the document management service 500, thus ending the sequence.

[Print Service Processing]

FIG. 12 is a flowchart of print service processing by the print service 600 which received a processing request according to this embodiment. Note that this processing is implemented when a CPU included in an apparatus, which implements the print service 600 in this embodiment, executes a program stored in, for example, a ROM as a storage unit. Note that the same step numbers denote the same processes as in the flowchart shown in FIG. 9, and only differences will be described below.

The access token verification module 612 checks in step S1503 whether or not the access token is authentic in step S1502. If the access token is authentic (YES in step S1503), the process advances to step S2501. If the access token is unauthentic (NO in step S1503), the process advances to step S1550. In step S2501, the second delegating range verification module 621 acquires the delegation-permitted authority list included in the second access token received in step S1501, and the process then advances to step S1506.

Note that in the processing shown in FIG. 9 of the first embodiment, the authority list delete request is issued in step S1508. However, in this embodiment, since the authority list is deleted in the authentication service 400 after the access token is issued and sent, this processing is not executed.

As described above, in the second embodiment, the access token (second access token in this embodiment) to be sent to the document management service 500 at the time of authority delegation is issued to include the delegated authority list.

Note that with the above configuration, since no inquiry (corresponding to step S1504 in FIG. 9) is generated from the print service 600, a storage area (an area required to hold the authority list) for the processing of this inquiry is not required.

According to the second embodiment, in addition to the effects of the first embodiment, the authority delegating service can delegate authorities by designating a range of authorities to be delegated without any additional storage area required to store and hold authorities delegated by the delegator.

<Third Embodiment>

The third embodiment for carrying out the present invention will be described below with reference to the drawings. The third embodiment has been made under the assumption that when the user requests to execute processing, an authority possessed by the user does not allow to execute that processing. In such case, this embodiment presents a range of processes which can be executed according to the authority possessed by the user, and an authority is delegated based on the process selected from the presented processes.

[Module Configuration]

Figure 13A:
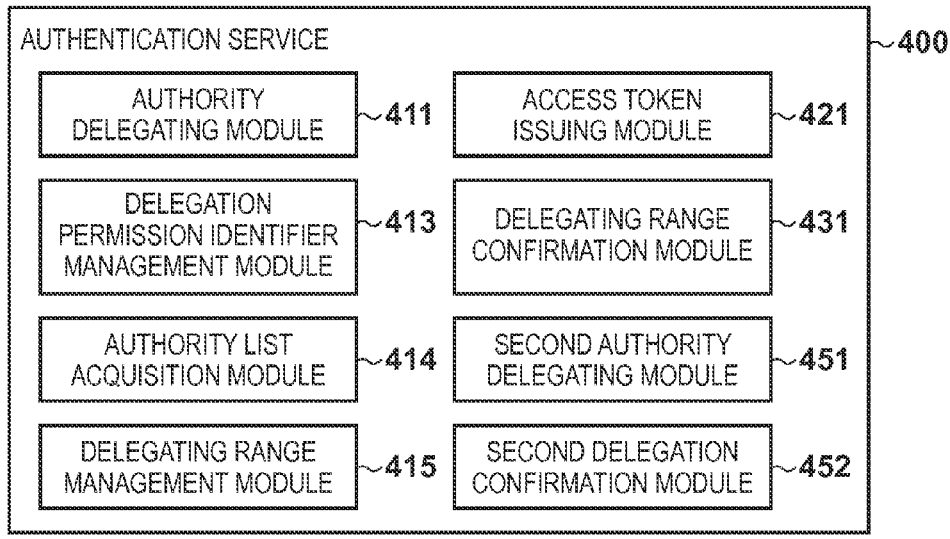
FIGS. 13A, 13B, and 13C are diagrams showing the module configurations of respective services according to the third embodiment.
Figure 13B:
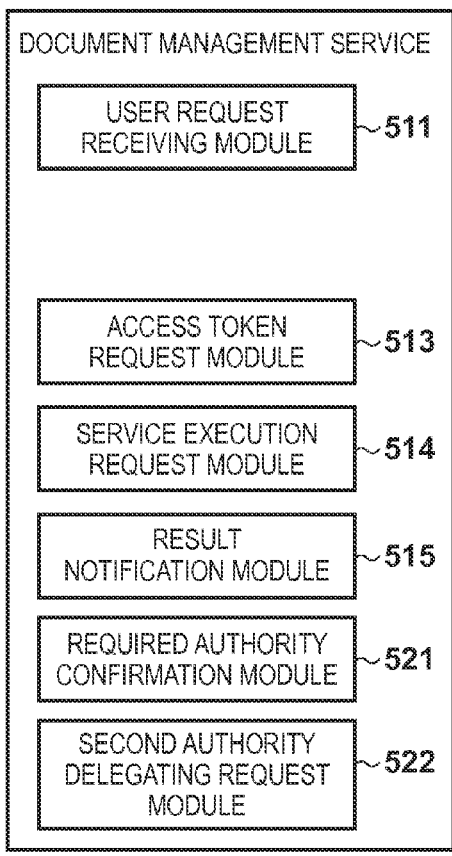
Figure 13C:
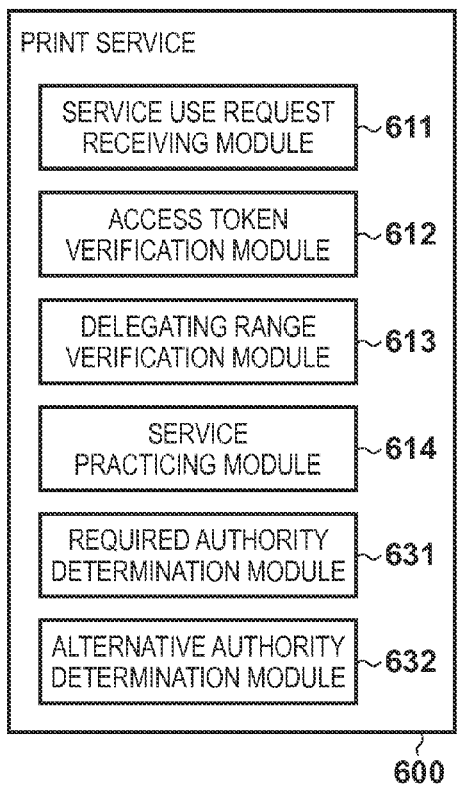

FIGS. 13A to 13C show the module configurations according to this embodiment. Differences from the module configurations in the first embodiment shown in FIGS. 4A to 4C will be described first.

FIG. 13A shows the module configuration of the authentication service 400 according to this embodiment. The authentication service 400 includes a second authority delegating module 451 and second delegation confirmation module 452. By contrast, the authentication service 400 of this embodiment does not include the delegation confirmation module 412 shown in FIG. 4A of the first embodiment.

FIG. 13B shows the module configuration of the document management service 500 according to this embodiment. The document management service 500 includes a required authority confirmation module 521 and second authority delegating request module 522. By contrast, the document management service 500 of this embodiment does not include the authority delegating request module 512 shown in FIG. 4B of the first embodiment.

FIG. 13C shows the module configuration of the print service 600 according to this embodiment. The print service 600 includes a required authority determination module 631 and alternative authority determination module 632.

[Document Management Service Processing]

Figure 14:
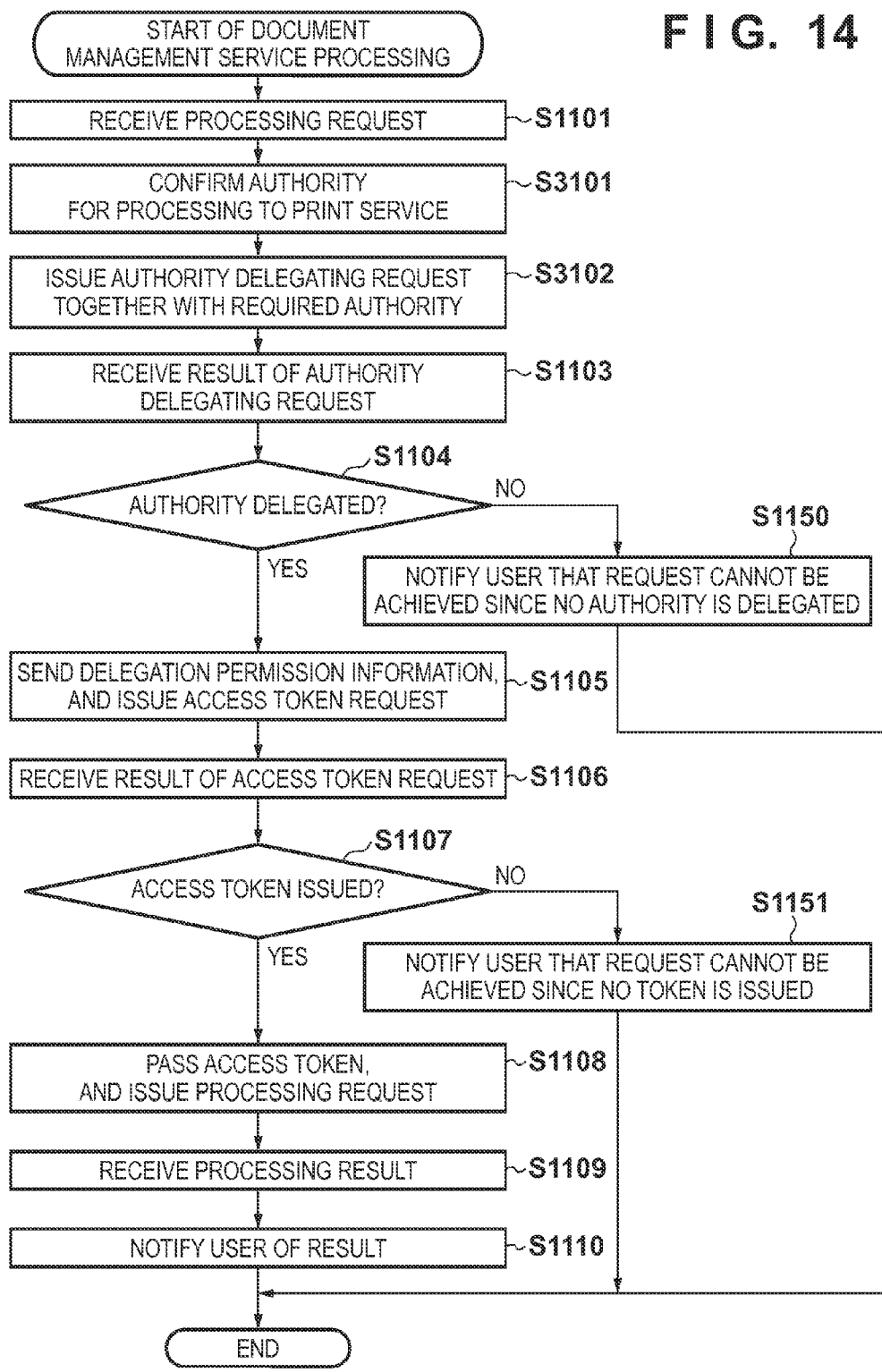
FIG. 14 is a flowchart of document management service processing according to the third embodiment.

FIG. 14 is a flowchart of document management service processing by the document management service 500 according to this embodiment. Note that this processing is implemented when a CPU included in an apparatus, which implements the document management service 500 in this embodiment, executes a program stored in, for example, a ROM as a storage unit. Note that the same step numbers denote the same processes as in the flowchart shown in FIG. 5, and only differences will be described below.

In step S1101, the user request receiving module 511 receives a print execution request, which designates a document in the document management service 500, from the client PC 110 according to an instruction of a delegator. In step S3101, the required authority confirmation module 521 notifies the print service 600 of the processing contents received in step S1101 to acquire information of an authority required for the processing from the print service 600. In response to this confirmation request of an authority required to execute the processing for the print service 600, for example, information corresponding to an authority list may be acquired. Assume that the print service 600 holds, in advance, information of authorities required for various processes provided by the print service 600. In step S3102, the second authority delegating request module 522 issues an authority delegating request to the authentication service 400 together with the information of the required authority received in step S3101, and the process then advances to step S1103.

[Authority Delegation Confirmation Processing]

Figure 15:
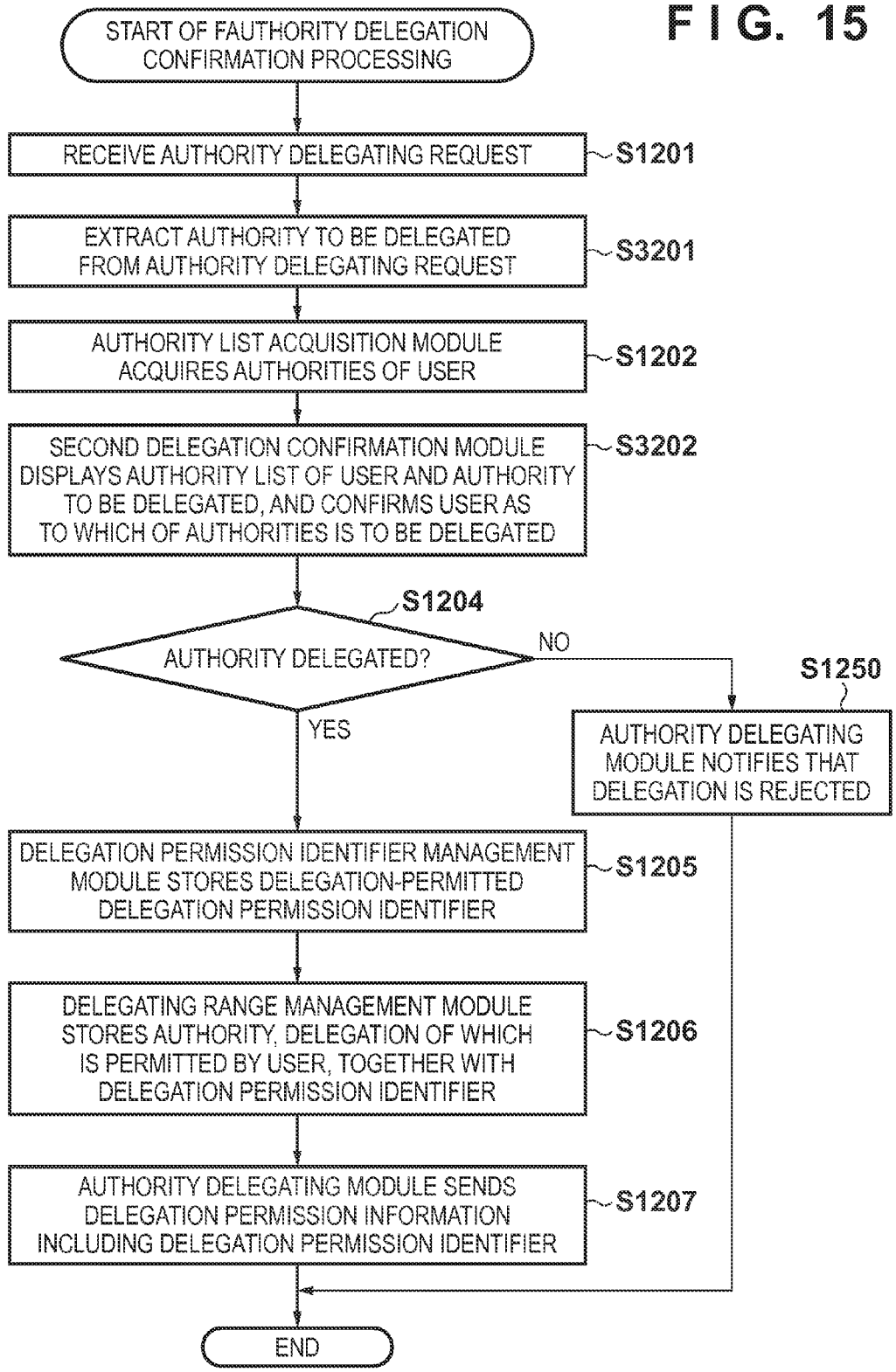
FIG. 15 is a flowchart of authority delegation confirmation processing according to the third embodiment.

FIG. 15 is a flowchart of authority delegation confirmation processing by the authentication service 400 which received an authority delegating request according to this embodiment. Note that this processing is implemented when a CPU included in an apparatus, which implements the authentication service 400 in this embodiment, executes a program stored in, for example, a ROM as a storage unit. Note that the same step numbers denote the same processes as in the flowchart shown in FIG. 6, and only differences will be described below.

In step S1201, the second authority delegating module 451 receives an authority delegating request from the document management service 500. At this time, the second authority delegating module 451 acquires information of the authority acquired by the document management service 500 from the print service together (corresponding to step S3102 in FIG. 14). In step S3201, the second authority delegating module 451 extracts the authority required to be delegated by the document management service 500 from the authority delegating request received in step S1201. In step S1202, the authority list acquisition module 414 acquires an authority list of the delegator for the print service 600, and the process then advances to step S3202. In step S3202, the second delegation confirmation module 452 presents the authority list of the delegator acquired in step S1202 and the information of the authority extracted in step S3201 to the client PC 110 operated by the delegator. In this embodiment, a UI via a Web browser is provided. In this case, the second delegation confirmation module 452 confirms which of authorities the delegator delegates to the document processing service 500, and the process then advances to step S1204.

[Required Authority Confirmation Processing]

Figure 16:
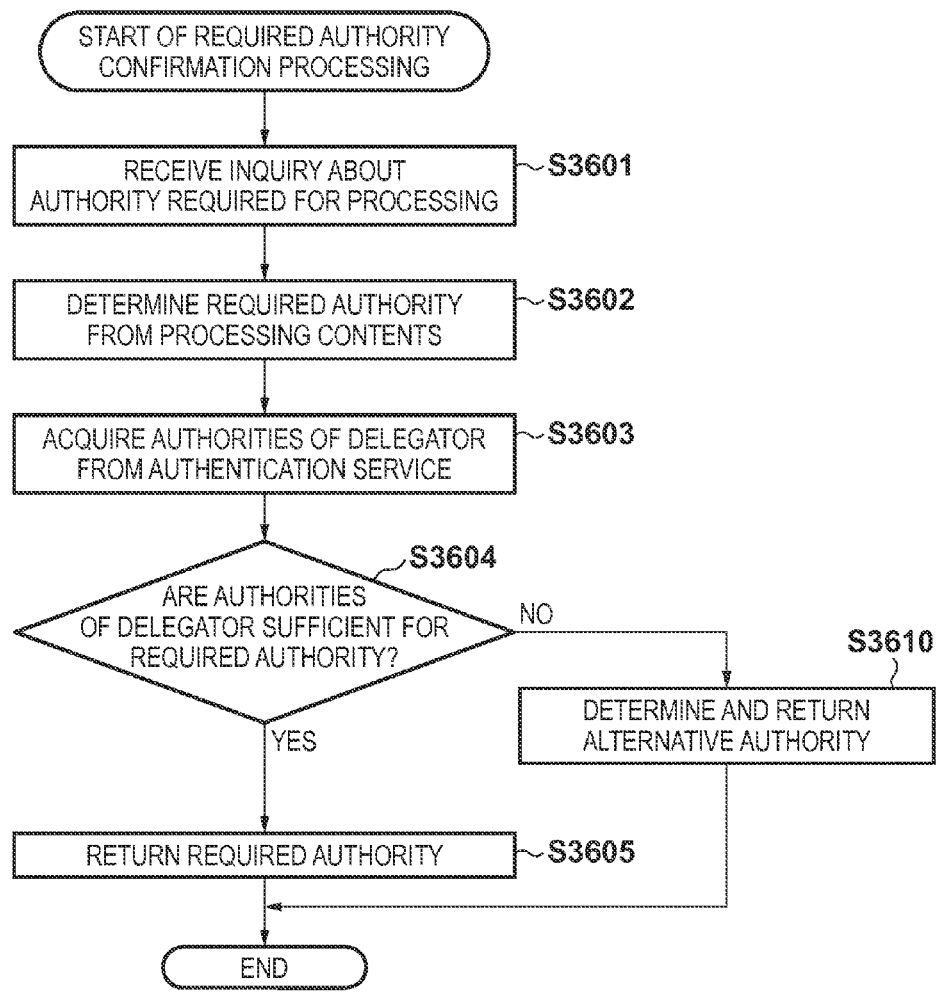
FIG. 16 is a flowchart of required authority confirmation processing according to the third embodiment.

FIG. 16 is a flowchart of required authority confirmation processing by the print service 600 which received a required authority confirmation. Note that this processing is implemented when a CPU included in an apparatus, which implements the print service 600 in this embodiment, executes a program stored in, for example, a ROM as a storage unit. Also, this processing is executed in response to an inquiry from the document management service 500 in step S3101 in FIG. 14.

In step S3601, the required authority determination module 631 receives an inquiry about an authority required for the processing from the document management service 500. In step S3602, the required authority determination module 631 determines an authority required for that processing based on the processing contents received in step S3601. In step S3603, the required authority determination module 631 acquires information of authorities of the delegator who requested the processing received in step S3601 from the authentication service 400. At this time, the authentication service 400 executes the processing shown in FIG. 8 described in the first embodiment. This process implements an authority acquisition unit.

The required authority determination module 631 checks in step S3604 whether or not the authorities of the delegator satisfy the required authority determined in step S3602 by comparing the information of the authorities of the delegator acquired in step S3603 with the authority required for the processing. As a result of checking, if the authorities of the delegator satisfy the required authority (YES in step S3604), the process advances to step S3605. If the authority required for the processing is insufficient and is not satisfied (NO in step S3604), the process advances to step S3610. For example, when the required authority is a color print authority, but the authorities possessed by the delegator do not include the color print authority, an insufficient authority for the processing is determined, and the process advances to step S3610.

In step S3605, the required authority determination module 631 sends the required authority determined in step S3602 to the document management service 500, thus ending the sequence. In step S3610, the alternative authority determination module 632 determines an authority as an alternative of the required authority determined in step S3602 of the authorities of the delegator acquired in step S3603. For example, assume that the authority required for the processing is a color print authority. By contrast, assume that the delegator does not possess the color print authority but possesses a monochrome print authority. Hence, in step S3602, the monochrome print authority is picked up as an alternative authority. Then, the determined alternative authority is sent to the document management service 500, thus ending the sequence.

Note that the document management service 500 receives the alternative authority sent from the print service 600 in step S3102 shown in FIG. 14, and issues an authority delegating request according to that result.

According to this embodiment, the delegator can delegate an authority in consideration of an authority required by the authority use service. When authorities of the delegator who requested the processing are insufficient, an alternative authority is presented to the delegator, thus allowing authority delegation that can obtain a result close to that the delegator wants.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-237914, filed Oct. 22, 2010, which is hereby incorporated by reference herein in its entirety.

What is claimed is:

1. An authority delegating system, which comprises an authentication apparatus, and delegates an authority possessed by a user to a second apparatus which requests a first apparatus, that executes a document processing service according to the authority, to execute the document processing,
    said authentication apparatus comprising:
        a processor and a memory;
        a receiving unit configured to receive an authority delegating request from said second apparatus;
        an acquisition unit configured to acquire information of authorities possessed by the user from a storage unit, and to acquire information of an authority required to execute a document processing request, the authority being specified by the first apparatus, based on a processing request notified from the second apparatus to the first apparatus;
        a comparison unit configured to compare the information of the authorities possessed by the user, which is acquired by the acquisition unit, with the information of the authority required to execute the document processing request, which is acquired by the acquisition unit;
        a providing unit configured to, if it is determined, based on a comparison result by the comparison unit, that the authorities possessed by the user do not satisfy the authority required to execute the document processing request, provide an authority delegating confirmation window which allows to delegate, to the second apparatus, an alternative authority that is different from an original authority required to execute the document processing request; and
        a transmission unit configured to transmit authentication information indicating that an authority permitted by the user via the authority delegating confirmation window has been delegated, and
    said first apparatus comprising:
        a processor and a memory;
        a request receiving unit configured to receive the document processing request from said second apparatus and the authentication information;
        a verification unit configured to verify, using the authentication information, which of authorities said second apparatus is delegated from the user; and
        an execution unit configured to execute document processing based on the document processing request when the authority required to execute the processing based on the document processing request is delegated to said second apparatus as a result of verification by said verification unit,
    wherein said authentication apparatus further comprises an issuing unit configured to issue an access token as the authentication information, and
    said verification unit of said first apparatus verifies, using the access token, which of authorities said second apparatus is delegated from the user.

2. The system according to claim 1, further comprising:
    a storage unit configured to store, when said authority delegating confirmation window receives an instruction to delegate the alternative authority to said second apparatus, an identifier required to uniquely identify the instruction and the alternative authority instructed by the user to delegate, in association with each other, and
    wherein said issuing unit of said authentication apparatus issues the access token including the identifier stored in said storage unit, and
    said verification unit of said first apparatus sends an inquiry to said authentication apparatus using the identifier included in the access token, so as to verify which of authorities said second apparatus is delegated from the user.

3. The system according to claim 1, wherein the original authority required to execute the document processing request is a color print authority, and the alternative authority is a monochrome print authority.

4. An authentication apparatus, included in an authority delegating system which delegates an authority possessed by a user to a second apparatus which requests a first apparatus that executes document processing according to the authority to execute the document processing, said authentication apparatus comprising:
- a processor and a memory;
- a receiving unit configured to receive an authority delegating request from the second apparatus;
- an acquisition unit configured to acquire information of authorities possessed by the user from a storage unit, and to acquire information of an authority required to execute a document processing request, the authority being specified by the first apparatus, based on the a document processing request notified from the second apparatus to the first apparatus;
- a comparison unit configured to compare the information of the authorities possessed by the user, which is acquired by the acquisition unit, with the information of the authority required to execute the document processing request, which is acquired by the acquisition unit;
- a providing unit configured to, if it is determined, based on a comparison result by the comparison unit, that the authorities possessed by the user do not satisfy the authority required to execute the document processing request, provide an authority delegating confirmation window which allows to delegate, to the second apparatus, an alternative authority that is different from an original authority required to execute the document processing request; and
- a transmission unit configured to transmit authentication information indicating that an authority permitted by the user via the authority delegating confirmation window has been delegated, wherein said authentication apparatus further comprises an issuing unit configured to issue an access token as the authentication information, and a verification unit of said first apparatus verifies, using the access token, which of authorities said second apparatus is delegated from the user.

5. An authority delegating method in an authority delegating system, which comprises an authentication apparatus, and delegates an authority possessed by a user to a second apparatus which requests a first apparatus, that executes a document processing service according to the authority, to execute the document processing, the method comprising:

in the authentication apparatus,
- a receiving step of receiving an authority delegating request from the second apparatus;
- an acquisition step of acquiring information of authorities possessed by the user from a storage unit, and acquiring information of an authority required to execute a document processing request, the authority being specified by the first apparatus, based on the document processing request notified from the second apparatus to the first apparatus;
- a comparison step of comparing the information of the authorities possessed by the user, which is acquired in the acquisition step, with the information of the authority required to execute the document processing request, which is acquired in the acquisition step;
- a providing step of providing, if it is determined, based on a comparison result in the comparison step, that the authorities possessed by the user do not satisfy the authority required to execute the document processing request, an authority delegating confirmation window which allows to delegate, to the second apparatus, an alternative authority that is different from an original authority required to execute the document processing request; and
- a transmission step of transmitting authentication information indicating that an authority permitted by the user via the authority delegating confirmation window has been delegated, and in the first apparatus,
- a request receiving step of receiving the document processing request from the second apparatus and the authentication information;
- a verification step of verifying, using the authentication information, which of authorities the second apparatus is delegated from the user; and
- an execution step of executing document processing based on the document processing request when the authority required to execute the processing based on the document processing request is delegated to the second apparatus as a result of verification in the verification step, wherein said authentication apparatus further comprises an issuing step of issuing an access token as the authentication information, and said verifying step in said first apparatus verifies, using the access token, which of authorities said second apparatus is delegated from the user.

6. A control method of an authentication apparatus, included in an authority delegating system which delegates an authority possessed by a user to a second apparatus which requests a first apparatus that executes a document processing service according to the authority to execute the document processing, the method comprising:
- a receiving step of receiving an authority delegating request from the second apparatus;
- an acquisition step of acquiring information of authorities possessed by the user from a storage unit, and acquiring information of an authority required to execute a document processing request, the authority being specified by the first apparatus, based on the document processing request notified from the second apparatus to the first apparatus;
- a comparison step of comparing the information of the authorities possessed by the user, which is acquired in the acquisition step, with the information of the authority required to execute the document processing request, which is acquired in the acquisition step;
- a providing step of providing, if it is determined, based on a comparison result in the comparison step, that the authorities possessed by the user do not satisfy the authority required to execute the document processing request, an authority delegating confirmation window which allows to delegate, to the second apparatus, an alternative authority that is different from an original authority required to execute the document processing request; and
- a transmission step of transmitting authentication information indicating that an authority permitted by the user via the authority delegating confirmation window has been delegated wherein said authentication apparatus further performs an issuing step of issuing an access token as the authentication information, and said first apparatus verifies, using the access token, which of the authorities said second apparatus is delegated from the user.

7. A non-transitory computer-readable medium storing computer-executable code of a program for controlling an authentication apparatus, included in an authority delegating system which delegates an authority possessed by a user to a second apparatus which requests a first apparatus that executes document processing according to the authority to execute the document processing, the code causing the authentication apparatus to execute:

a receiving step of receiving an authority delegating request from the second apparatus;

an acquisition step of acquiring information of authorities possessed by a user from a storage unit, and acquiring information of an authority required to execute a document processing request, the authority being specified by the first apparatus, based on a document processing request notified from the second apparatus to the first apparatus;

a comparison step of comparing the information of the authorities possessed by the user, which is acquired in the acquisition step, with the information of the authority required to execute the document processing request, which is acquired in the acquisition step;

a providing step of providing, if it is determined, based on a comparison result in the comparison step, that the authorities possessed by the user do not satisfy the authority required to execute the document processing request, an authority delegating confirmation window which allows to delegate, to the second apparatus, an alternative authority that is different from an original authority required to execute the document processing request; and a transmission step of transmitting authentication information indicating that an authority permitted by the user via the authority delegating confirmation window has been delegated, wherein said authentication apparatus further executes an issuing step of issuing an access token as the authentication information, and said first apparatus verifies, using the access token, which of the authorities said second apparatus is delegated from the user.

* * * * *